United States Patent
Lee et al.

(10) Patent No.: US 11,148,949 B2
(45) Date of Patent: Oct. 19, 2021

(54) METHOD OF PREPARING HIGH-PURITY LITHIUM DIFLUOROPHOSPHATE CRYSTAL AND NON-AQUEOUS ELECTROLYTE SOLUTION FOR SECONDARY BATTERY INCLUDING THE CRYSTAL

(71) Applicant: CHUN BO., LTD, Chungcheongbuk-do (KR)

(72) Inventors: Sang Yul Lee, Chungcheongbuk-do (KR); Kyoung Cheol Kim, Chungcheongbuk-do (KR); Kyoung Hwan Kim, Chungcheongbuk-do (KR); Ji Ung Jeon, Chungcheongbuk-do (KR); Su Cheol Park, Chungcheongbuk-do (KR)

(73) Assignee: Chun Bo., Ltd, Chungcheongbuk-do (KR)

( * ) Notice: Subject to any disclaimer, the term of this patent is extended or adjusted under 35 U.S.C. 154(b) by 0 days.

(21) Appl. No.: 16/476,854

(22) PCT Filed: Jun. 25, 2018

(86) PCT No.: PCT/KR2018/007159
§ 371 (c)(1),
(2) Date: Jul. 9, 2019

(87) PCT Pub. No.: WO2019/245092
PCT Pub. Date: Dec. 26, 2019

(65) Prior Publication Data
US 2021/0246027 A1    Aug. 12, 2021

(30) Foreign Application Priority Data
Jun. 21, 2018 (KR) .................. 10-2018-0071484

(51) Int. Cl.
C01B 25/455 (2006.01)
H01M 10/0568 (2010.01)

(52) U.S. Cl.
CPC ....... C01B 25/455 (2013.01); H01M 10/0568 (2013.01); *C01P 2006/40* (2013.01); *C01P 2006/80* (2013.01); *H01M 2300/002* (2013.01)

(58) Field of Classification Search
None
See application file for complete search history.

(56) References Cited

FOREIGN PATENT DOCUMENTS

| | | | | |
|---|---|---|---|---|
| CN | 105731412 | 7/2016 | | |
| CN | 107244663 | 10/2017 | | |
| EP | 2357154 | 8/2011 | | |
| EP | 2712843 | 9/2012 | | |
| EP | 2826747 | 1/2015 | | |
| EP | 3231769 | 10/2017 | | |
| JP | 2001-006729 | 1/2001 | | |
| JP | 2002-501034 | 1/2002 | | |
| JP | 2005-219994 | 8/2005 | | |
| JP | 2014-062036 | 4/2014 | | |
| JP | 2014062036 A | * | 4/2014 | |
| JP | 2015-044701 | 3/2015 | | |
| JP | 2015-523951 | 8/2015 | | |
| KR | 10-2009-0118117 | 11/2009 | | |
| KR | 10-2011-0052536 | 5/2011 | | |
| KR | 20110052536 A | * | 5/2011 | ........ H01M 10/0569 |
| KR | 10-2013-0102969 | 9/2013 | | |
| KR | 10-2015-0016511 | 2/2015 | | |
| KR | 10-2015-0045528 | 4/2015 | | |
| KR | 10-2017-0042079 | 4/2017 | | |
| KR | 10-1739936 | 6/2017 | | |
| KR | 10-2017-0078784 | 7/2017 | | |

OTHER PUBLICATIONS

U.S. Appl. No. 16/476,858, filed Jul. 9, 2019, by Lee et al. (Copy not submitted herewith pursuant to the waiver of 37 C.F. R. § 1.98(a)(2)(iii) issued by the Office on Sep. 21, 2004).
Notice of Allowance for KR 10-2018-0071484, dated Nov. 9, 2018, 7 pages (including English translation).
Amendment for KR 10-2018-0071484 dated Oct. 15, 2018, and English translation.
Office Action for KR 10-2018-0071484 dated Sep. 13, 2018 and English translation.
Response for KR 10-2018-0071484 dated Oct. 15, 2018, and English translation.

* cited by examiner

*Primary Examiner* — Daniel S Gatewood
(74) *Attorney, Agent, or Firm* — Morrison & Foerster LLP

(57) ABSTRACT

The present invention relates to a method of preparing a lithium difluorophosphate crystal. More particularly, the present invention relates to a method of preparing a high-purity lithium difluorophosphate crystal at a high yield, and the high-purity lithium difluorophosphate crystal prepared by the method can be used for various purposes.

7 Claims, No Drawings

METHOD OF PREPARING HIGH-PURITY LITHIUM DIFLUOROPHOSPHATE CRYSTAL AND NON-AQUEOUS ELECTROLYTE SOLUTION FOR SECONDARY BATTERY INCLUDING THE CRYSTAL

CROSS REFERENCE TO RELATED APPLICATIONS

This application is a national stage application under 35 U.S.C. § 371 of International Application No. PCT/KR2018/007159, filed internationally on Jun. 25, 2018, which claims priority to and the benefit of Korean Patent Application No. 2018-0071484, filed on Jun. 21, 2018, the disclosures of which are incorporated herein by reference in their entirety.

BACKGROUND

1. Field of the Invention

The present invention relates to: a method of preparing a lithium difluorophosphate crystal; and a non-aqueous electrolyte solution for a secondary battery, which includes the lithium difluorophosphate crystal.

2. Discussion of Related Art

Lithium difluorophosphate is a compound having industrial utility as a component for a wood preservative (see Patent Document 1), a toothbrush sterilizer, a polymer stabilizer, and the like.

Meanwhile, in response to recent demands for the weight reduction and miniaturization of electric products, the development of a secondary battery having a high energy density, e.g., a lithium ion secondary battery, is underway. Further, the application field of lithium ion secondary batteries is expanding, and this expansion requires the batteries to have even more improved characteristics. In order to bring an improvement to the battery characteristics, such as load characteristics, cycle characteristics, storage characteristics, low-temperature characteristics, and the like, of such lithium ion secondary batteries, non-aqueous solvents and electrolytes have been considered and extensively studied. For example, a battery in which the decomposition of an electrolyte solution is suppressed to the minimum and thus excellent storage characteristics and excellent cycle characteristics are exhibited is currently in production using an electrolyte solution containing a vinyl ethylene carbonate compound, and there has been disclosed a technique of increasing the recovery capacity after storage of an existing lithium ion secondary battery by using an electrolyte solution containing propanesultone along with the battery.

The existing electrolyte solutions for a lithium ion secondary battery may exhibit the effect of improving the storage characteristics or the cycle characteristics to some extent, but have limitations in that a coating having high resistance is formed on the negative electrode side, adversely affecting the low-temperature discharge characteristics, the high-current discharge characteristics, or the like.

Hence, there has been developed a technique of employing lithium difluorophosphate having excellent safety while being capable of improving the low-temperature discharge characteristics, the high-current discharge characteristics, the high-temperature storage characteristics, and the cycle characteristics as a component (additive) for a secondary battery electrolyte solution. The technique, however, has its limitations in that lithium difluorophosphate is prepared with low efficiency, low purity, and the like.

SUMMARY OF THE INVENTION

The present invention was devised to solve the above-described problems, and is directed to providing a novel method of preparing a high-purity lithium difluorophosphate crystal and the use of the prepared lithium difluorophosphate crystal as an electrolyte for a secondary battery and the like.

To solve the above-described problems, one aspect of the present invention provides a method of preparing a lithium difluorophosphate crystal (hereinafter referred to as Method 1) in which a lithium difluorophosphate crystal is prepared through processes including: Step 1 in which lithium hexafluorophosphate ($LiPF_6$), a chloride, and water are reacted with one another under a solvent-free condition, and thereby a lithium difluorophosphate crystal ($LiPO_2F_2$) is synthesized; and Step 2 in which the lithium difluorophosphate crystal is purified and subsequently recrystallized.

In one preferred embodiment of the present invention, the Step 1 of Method 1 may include: Step 1-1 in which the lithium hexafluorophosphate and the chloride are pulverized and mixed, and thereby a mixture of pulverized reactants is prepared; Step 1-2 in which the mixture of pulverized reactants is introduced into a reactor, and then nitrogen gas is passed through the reactor so that the air in the reactor is replaced with the nitrogen gas; and Step 1-3 in which steam is introduced into the reactor, a reaction is carried out while bubbling the steam, and upon completion of the reaction, filtration is performed to obtain a reaction product.

In one preferred embodiment of the present invention, in the Step 1-1 of Method 1, the lithium hexafluorophosphate and the chloride may be mixed in a molar ratio of 1:4.0 to 5.5.

In one preferred embodiment of the present invention, in the Step 1-2 of Method 1, the nitrogen gas may be introduced at a temperature of 40 to 55° C. for 20 to 50 minutes, thereby replacing the air in the reactor.

In one preferred embodiment of the present invention, in the Step 1-3 of Method 1, the temperature of the steam may range from 50 to 80° C.

In one preferred embodiment of the present invention, in the Step 1-3 of Method 1, the steam may be introduced in an amount such that there are 3.5 to 4.5 moles of the steam for one mole of the lithium hexafluorophosphate of the Step 1-1. Here, the amount of the steam referred to in the above-described molar ratio is based on the amount of water contained in the steam.

According to the present invention, a lithium difluorophosphate crystal may be prepared by an alternative method (hereinafter referred to as Method 2) in which a lithium difluorophosphate crystal is prepared through processes including: Step 1 in which a chloride hydrate and lithium hexafluorophosphate are reacted with each other under a solvent-free condition, and thereby a lithium difluorophosphate crystal ($LiPO_2F_2$) is synthesized; and Step 2 in which the lithium difluorophosphate crystal is purified and subsequently recrystallized.

In one preferred embodiment of the present invention, the Step 1 of Method 2 may consist of the processes including: Step 1-1 in which a chloride and water are mixed and reacted with each other, and thereby a chloride hydrate is produced; Step 1-2 in which lithium hexafluorophosphate is added to the chloride hydrate, which has been recovered, in a reactor, and then nitrogen gas is passed through the reactor so that the air in the reactor is replaced with the nitrogen gas; and Step 1-3 in which the temperature is raised and then a reaction is carried out, and upon completion of the reaction, filtration is performed to obtain a reaction product.

In one preferred embodiment of the present invention, in the Step 1-1 of Method 2, the chloride hydrate is prepared by reacting the chloride and the water, which may have been mixed in a molar ratio of 1:0.35 to 0.80.

In one preferred embodiment of the present invention, in the Step 1-2 of Method 2, the lithium hexafluorophosphate may be introduced in an amount such that there is 0.15 to 0.40 mole of the lithium hexafluorophosphate for one mole of the chloride of the Step 1-1.

In one preferred embodiment of the present invention, in the Step 1 of Method 1 and the Step 1 of Method 2, the yield of the synthesized lithium difluorophosphate crystal may range from 80 to 99.9%.

In one preferred embodiment of the present invention, the Step 2 of Method 1 and/or the Step 2 of Method 2 may include: Step 2-1 in which a lithium difluorophosphate crystal and an aqueous solution of an alcohol having two to four carbon atoms are introduced into a reactor and subjected to stirring, and thereby purification is performed; Step 2-2 in which the purified product is subjected to primary vacuum concentration; Step 2-3 in which the primary vacuum concentrate is subjected to secondary vacuum concentration; and Step 2-4 in which the secondary vacuum concentrate is dried and subsequently cooled to induce recrystallization, and thereby a lithium difluorophosphate crystal is obtained.

In one preferred embodiment of the present invention, the reactor of the Step 2-1 of Method 1 and/or the reactor of the Step 2-1 of Method 2 may be equipped with a jacket, a vacuum pump, a condenser, and a receiver.

In one preferred embodiment of the present invention, in the Step 2-1 of Method 1 and/or the Step 2-1 of Method 2, the aqueous alcohol solution may be used in an amount of 550 to 650 parts by weight with respect to 100 parts by weight of the lithium difluorophosphate crystal.

In one preferred embodiment of the present invention, the purification process of the Step 2-1 of Method 1 and/or the purification process of the Step 2-1 of Method 2 may be performed in a nitrogen atmosphere at a temperature of 23 to 30° C., the primary vacuum concentration of the Step 2-2 may be performed at a temperature of 40 to 45° C. and a pressure of 25 to 30 Torr, and the secondary vacuum concentration of the Step 2-3 may be performed at a temperature of 40 to 45° C. and a pressure of 2 Torr or less.

In one preferred embodiment of the present invention, the drying process of the Step 2-4 of Method 1 and/or the drying process of the Step 2-4 of Method 2 may be performed using a rotary evaporator in a vacuum atmosphere of 2 Torr or less at a temperature of 70 to 90° C.

In one preferred embodiment of the present invention, in the Step 2-4 of Method 1 and/or the Step 2-4 of Method 2, the yield of the lithium difluorophosphate crystal obtained through recrystallization may range from 75 to 95%.

In one preferred embodiment of the present invention, the lithium difluorophosphate crystal obtained through the recrystallization of the Step 2-4 of Method 1 and/or the lithium difluorophosphate crystal obtained through the recrystallization of the Step 2-4 of Method 2 may satisfy a degree of increase in purity of the following Formula 1.

$$3.5\% \leq (B-A)/A \times 100\% \leq 10\%$$ [Formula 1]

In Formula 1, A represents the purity (%) of a lithium difluorophosphate crystal synthesized in Step 1, and B represents the purity (%) of a lithium difluorophosphate crystal obtained through recrystallization in Step 2.

In one preferred embodiment of the present invention, the Method 1 and/or the Method 2 may further include Step 3 in which the lithium difluorophosphate crystal obtained through recrystallization is dried.

Another aspect of the present invention provides a high-purity lithium difluorophosphate crystal prepared by the above-described preparation method.

Still another aspect of the present invention provides the use of the high-purity lithium difluorophosphate crystal as an electrolyte for a non-aqueous electrolyte solution for a secondary battery.

Yet another aspect of the present invention provides a non-aqueous electrolyte solution for a secondary battery, which includes the lithium difluorophosphate crystal as an electrolyte.

DETAILED DESCRIPTION OF EXEMPLARY EMBODIMENTS

Hereinafter, the method of preparing a high-purity lithium difluorophosphate crystal according to the present invention will be described in more detail.

According to the present invention, a lithium difluorophosphate crystal may be prepared under a solvent-free condition, by using one of the following two methods.

The first method of preparing a lithium difluorophosphate crystal (Method 1) includes: Step 1 in which lithium hexafluorophosphate ($LiPF_6$), a chloride, and water are reacted with one another under a solvent-free condition, and thereby a lithium difluorophosphate crystal ($LiPO_2F_2$) is synthesized; and Step 2 in which the lithium difluorophosphate crystal is purified and subsequently recrystallized, and thereby a high-purity lithium difluorophosphate crystal is prepared.

The Step 1 of Method 1 is a process in which a semi-productized, unpurified lithium difluorophosphate crystal is synthesized, and may consist of the processes including: Step 1-1 in which the lithium hexafluorophosphate and the chloride are pulverized and mixed, and thereby a mixture of pulverized reactants is prepared; Step 1-2 in which the mixture of pulverized reactants is introduced into a reactor, and then nitrogen gas is passed through the reactor so that the air in the reactor is replaced with the nitrogen gas; and Step 1-3 in which steam (i.e., a water-containing vapor) is introduced into the reactor, a reaction is carried out while bubbling the steam, and upon completion of the reaction, filtration is performed to obtain a reaction product.

In Step 1-1 of Method 1, the lithium hexafluorophosphate and the chloride may be mixed in a molar ratio of 1:4.0 to 5.5, preferably in a molar ratio of 1:4.0 to 5.0, and more preferably in a molar ratio of 1:4.1 to 4.5. It is recommended that the above-described molar ratio be satisfied because when there are less than 4.0 moles of the chloride for one mole of the lithium hexafluorophosphate, the yield may be decreased, and when there are more than 5.5 moles of the chloride for one mole of the lithium hexafluorophosphate, not only a larger amount of by-products may be produced but also cost efficiency may be degraded.

One, two or more types of chlorides selected among alkali metal salts (e.g., lithium chloride, sodium chloride, potassium chloride, and cesium chloride), magnesium chloride, calcium chloride, strontium chloride, barium chloride, aluminum chloride, ammonium chloride, silicon tetrachloride, iron(II) chloride, iron(III) chloride, nickel chloride, titanium tetrachloride, chromium(III) chloride, manganese chloride, and copper chloride may be used as the chloride. It is preferable to use one, two or more types of chlorides selected among lithium chloride, sodium chloride, potassium chloride, cesium chloride, magnesium chloride, calcium chloride, strontium chloride, barium chloride, and aluminum chloride as the chloride, and it is more preferable to use lithium chloride as the chloride because lithium chloride does not contain a cation as an impurity.

The subsequent Step 1-2 of Method 1 is a process in which the mixture of pulverized reactants, which has been recovered, is introduced into a reactor, and then nitrogen gas is passed through the inside of the reactor at a temperature of 40 to 55° C. for 20 to 50 minutes and preferably at a temperature of 45 to 52° C. for 20 to 50 minutes, so that the air in the reactor is replaced with the nitrogen gas.

In the subsequent Step 1-3 of Method 1, the temperature of the water or steam being introduced into the reactor may range from 50 to 80° C. and preferably ranges from 65 to 80° C., and more preferably ranges from 65 to 75° C. When the temperature of the steam is less than 50° C., the yield and purity of the reaction product may be lowered, and when the temperature of the steam is greater than 80° C., the temperature inside the reactor may become excessively high, causing the reaction to proceed rapidly and thus adversely affecting stability.

In Step 1-3, the steam may be introduced in an amount such that there are 3.5 to 4.5 moles, preferably 3.65 to 4.35 moles, and more preferably 3.75 to 4.15 moles of the steam for one mole of the lithium hexafluorophosphate of the Step 1-1. Here, when there are less than 3.5 moles of the steam for one mole of the lithium hexafluorophosphate, the yield may be decreased, and when there are more than 4.5 moles of the steam for one mole of the lithium hexafluorophosphate, side reactions such as a hydrolysis reaction in which a monofluorophosphate is produced and an additional hydrolysis reaction in which the monofluorophosphate is further hydrolyzed to produce a phosphate may undesirably take place. Here, the amount of the steam referred to in the above-described molar ratio is based on the amount of water contained in the steam.

In the Step 1-3 of Method 1, the chloride, the lithium hexafluorophosphate, and the water contained in the mixture of pulverized reactants may be reacted with one another at a temperature of 45 to 60° C. and preferably at a temperature of 45 to 55° C. for about 7 to 12 hours and preferably for about 8 to 10 hours, thereby synthesizing a reaction product.

The filtration may be performed by a generally-used filtration method in the art. For example, upon completion of the synthesis, the synthesized reaction product obtained in the form of a solution is cooled to 10 to 15° C., preferably by brine cooling, afterward the cooled reaction product is subjected to filtration to separate solids from liquids, and thereby a lithium difluorophosphate crystal is obtained.

The yield of the lithium difluorophosphate crystal obtained through the Steps 1-1 to 1-3 of Method 1 preferably ranges from 80% to 99.9% and more preferably ranges from 86% to 98.5%.

The Step 2 of Method 1 is a process in which the lithium difluorophosphate crystal obtained through Step 1 is purified and subsequently recrystallized.

The Step 2 includes: Step 2-1 in which a lithium difluorophosphate crystal and an aqueous alcohol solution are introduced into a reactor and subjected to stirring, and thereby purification is performed; Step 2-2 in which the purified product is subjected to primary vacuum concentration; Step 2-3 in which the primary vacuum concentrate is subjected to secondary vacuum concentration; and Step 2-4 in which the secondary vacuum concentrate is dried and subsequently cooled to induce recrystallization, and thereby a lithium difluorophosphate crystal is obtained.

The reactor of the Step 2 may be equipped with a jacket, a vacuum pump, a condenser, a scrubber, and/or a receiver.

The aqueous alcohol solution of the Step 2-1 may be an aqueous solution of an alcohol having two to four carbon atoms, and it is preferably an aqueous solution of an alcohol having two to four carbon atoms and more preferably an aqueous ethanol solution having an ethanol concentration of 99.5% to 99.8%. The aqueous alcohol solution may be used in an amount of 500 to 700 parts by weight, preferably 540 to 660 parts by weight, and more preferably 560 to 640 parts by weight with respect to 100 parts by weight of the lithium difluorophosphate crystal. It is recommended that the above-described range be satisfied because when the aqueous alcohol solution is used in an amount of less than 500 parts by weight with respect to 100 parts by weight of the lithium difluorophosphate crystal, the effect of purification may be reduced due to a reduction in solubility, and when the aqueous alcohol solution is used in an amount of more than 700 parts by weight with respect to 100 parts by weight of the lithium difluorophosphate crystal, economic feasibility may be decreased due to an increase in production costs.

Meanwhile, it is recommended that the purification process of the Step 2-1 be performed in a nitrogen atmosphere at a temperature of 23 to 30° C., and it is preferable that the purification process be performed in a nitrogen atmosphere at a temperature of 23 to 27° C.

The subsequent Step 2-2 is a process in which the purified product obtained in Step 2-1 is subjected to primary vacuum concentration. In this case, the primary vacuum concentration may be performed while maintaining a pressure of 25 to 30 Torr in the reactor whose internal temperature has been previously raised to a temperature of 40 to 45° C., and may be continued until all the alcohol vapor distilled from the reactor has been condensed in the condenser and thus no more liquid is collected in the receiver. When the primary vacuum concentration is performed at a temperature of less than 40° C., solvent distillation may not take place and thus productivity may be reduced, and when the primary vacuum concentration is performed at a temperature of greater than 45° C., crystallization may occur, making the concentrate unable to be transferred to a secondary drier. In addition, when the primary vacuum concentration is performed at a pressure of less than 25 Torr, the solvent may overflow into the pump, and when the primary vacuum concentration is performed at a pressure of greater than 30 Torr, productivity may be reduced due to an increase in process time.

The subsequent Step 2-3 is a process in which the primary vacuum concentrate is subjected to secondary vacuum concentration, and it is recommended that Step 2-3 be performed at a temperature of 40 to 45° C. and a pressure of 2 Torr or less and preferably at a temperature of 40 to 45° C. and a pressure of 1 Torr or less. In Step 2-3, when a suitable amount of the vacuum concentrate is obtained, the secondary vacuum concentration process is terminated by terminating the vacuum state with nitrogen. In this case, when the secondary vacuum concentration is performed at a pressure of greater than 2 Torr, productivity may be reduced due to an increase in concentration time.

The subsequent Step 2-4 is a process in which the secondary vacuum concentrate is dried, wherein the drying process is performed by a generally-used drying method in the art. According to a preferred embodiment of the present invention, it is recommended that the drying process be rotary drying be performed for about 10 to 14 hours in a vacuum atmosphere of 2 Torr or less at a temperature of 70 to 90° C. and preferably in a vacuum atmosphere of 1 Torr or less at a temperature of 80 to 90° C., using a rotary evaporator.

Once the drying process is completed, the dried product may be cooled to a temperature of 25° C. or less to induce recrystallization, and thereby a lithium difluorophosphate crystal is finally obtained.

The yield of the lithium difluorophosphate crystal of the present invention, which is obtained through recrystallization by carrying out the Steps 1 and 2 of Method 1, may be 75% or more and preferably ranges from 80 to 95%, and more preferably ranges from 82 to 95%.

In addition, the purity of the lithium difluorophosphate crystal obtained through recrystallization may satisfy the following Formula 1.

$$3.5\% \leq (B-A)/A \times 100\% \leq 10\%, \text{ preferably } 4.0\% \leq (B-A)/A \times 100\% \leq 8.5\%, \text{ and more preferably } 4.5\% \leq (B-A)/A \times 100\% \leq 7.5\%$$

In Formula 1, A represents the purity (%) of a lithium difluorophosphate crystal synthesized in Step 1, and B represents the purity (%) of a lithium difluorophosphate crystal obtained through recrystallization in Step 2.

The second method of preparing a lithium difluorophosphate crystal of the present invention under a solvent-free condition (Method 2) includes: Step 1 in which a chloride, lithium hexafluorophosphate, and water (or steam) are reacted with one another under a solvent-free condition, and thereby a lithium difluorophosphate crystal ($LiPO_2F_2$) is synthesized; and Step 2 in which the lithium difluorophosphate crystal is purified and subsequently recrystallized.

The Step 1 of Method 2 may consist of the processes including: Step 1-1 in which the chloride and the water are mixed and reacted with each other, and thereby a chloride hydrate is produced; Step 1-2 in which lithium hexafluorophosphate is added to the chloride hydrate, which has been recovered, in a reactor, and then nitrogen gas is passed through the reactor so that the air in the reactor is replaced with the nitrogen gas; and Step 1-3 in which the temperature is raised and then a reaction is carried out, and upon completion of the reaction, filtration is performed to obtain a reaction product.

In the Step 1-1 of Method 2, the chloride hydrate is prepared by reacting the chloride and the water, which may have been mixed in a molar ratio of 1:0.35 to 0.80, preferably in a molar ratio of 1:0.45 to 0.75, and more preferably in a molar ratio of 1:0.45 to 0.65. When there is less than 0.35 mole of the water for one mole of the chloride, the yield of the chloride hydrate may be low, and when there is more than 0.80 mole of the water for one mole of the chloride, production costs may be increased due to the unnecessary and excessive material use.

One, two or more types of chlorides selected among alkali metal salts (e.g., lithium chloride, sodium chloride, potassium chloride, and cesium chloride), magnesium chloride, calcium chloride, strontium chloride, barium chloride, aluminum chloride, ammonium chloride, silicon tetrachloride, iron(II) chloride, iron(III) chloride, nickel chloride, titanium tetrachloride, chromium(III) chloride, manganese chloride, and copper chloride may be used as the chloride. It is preferable to use one, two or more types of chlorides selected among lithium chloride, sodium chloride, potassium chloride, cesium chloride, magnesium chloride, calcium chloride, strontium chloride, barium chloride, and aluminum chloride as the chloride, and it is more preferable to use lithium chloride as the chloride because lithium chloride does not contain a cation as an impurity.

In the Step 1-2 of Method 2, it is favorable in terms of securing a suitable yield of the lithium difluorophosphate crystal if the lithium hexafluorophosphate is introduced in an amount such that there is 0.15 to 0.40 mole, preferably 0.20 to 0.35 mole, and more preferably 0.25 to 0.35 mole of the lithium hexafluorophosphate for one mole of the chloride of the Step 1-1. When the above-described range is not satisfied, the yield of the lithium difluorophosphate crystal may be decreased.

The yield of the lithium difluorophosphate crystal obtained through the Steps 1-1 to 1-3 of Method 2 may be 50% or more and preferably ranges from 60 to 80%, and more preferably ranges from 65 to 75%.

The Step 2 of Method 2, in which the lithium difluorophosphate crystal is purified and subsequently recrystallized, is the same as the Step 2 of Method 1, following the same purification and recrystallization processes.

The yield of the lithium difluorophosphate crystal of the present invention, which is obtained through recrystallization by carrying out the Steps 1 and 2 of Method 1, may be 75% or more and preferably ranges from 80 to 95%, and more preferably ranges from 82 to 95%.

Meanwhile, the yield of the lithium difluorophosphate crystal of the present invention, which is obtained through recrystallization by carrying out the Steps 1 and 2 of Method 2, may be 75% or more and preferably ranges from 75 to 95%, and more preferably ranges from 75 to 92%.

In addition, the purity of the lithium difluorophosphate crystal obtained through recrystallization may satisfy the following Formula 1.

$$3.5\% \leq (B-A)/A \times 100\% \leq 10\%, \text{ preferably } 4.0\% \leq (B-A)/A \times 100\% \leq 8.5\%, \text{ and more preferably } 4.5\% \leq (B-A)/A \times 100\% \leq 7.5\% \quad \text{[Formula 1]}$$

In Formula 1, A represents the purity (%) of a lithium difluorophosphate crystal synthesized in Step 1, and B represents the purity (%) of a lithium difluorophosphate crystal obtained through recrystallization in Step 2.

The lithium difluorophosphate crystal of the present invention prepared by the above-described method can be used for various purposes, for example, as a component for a stabilizer for a chloroethylene polymer, a reaction catalyst for a lubricating oil, a toothbrush sterilizer, a wood preservative, and the like, and is preferably useful as an electrolyte for a non-aqueous electrolyte solution for a secondary battery.

Hereinafter, the present invention will be described in more detail with reference to exemplary embodiments. However, the following exemplary embodiments are provided to aid understanding of the present invention, and the scope of the present invention should not be construed as being limited by the embodiments.

EXAMPLES

Example 1: Preparation of Lithium Difluorophosphate Crystal Through Recrystallization (1) Synthesis of Lithium Difluorophosphate Crystal ($LiPO_2F_2$) (Step 1)

At a temperature below the dew point (i.e., at a temperature of less than −50° C.), 60.0 g of lithium hexafluorophosphate and 70.8 g of a chloride (lithium chloride) were introduced into a reactor made of a perfluoroalkoxy alkane (PFA) and then pulverized and mixed together. After the temperature inside the reactor was raised to 50° C., nitrogen gas was passed through the reactor for 30 minutes for the inside of the reactor to become a nitrogen atmosphere. Afterward, the temperature was raised to 50° C. and the reaction was carried out for 30 minutes while maintaining this temperature.

Next, a reaction was carried out at 50° C. by introducing 28 g of 70° C. steam into the reactor and allowing it to bubble, for nine hours while stirring. Upon completion of the reaction, the inside of the reactor was cooled to a temperature of 12 to 13° C. Here, the steam being introduced into the reactor was prepared by generating nitrogen gas bubbles in a 70° C. hot water.

Next, the synthesized reaction product obtained in the form of a solution and then cooled was subjected to filtration, and thereby 40.5 g of a lithium difluorophosphate crystal was obtained (yield: 95%, purity: 95.2%).

(2) Preparation of Lithium Difluorophosphate Crystal Through Recrystallization (Step 2)

40.5 g of the lithium difluorophosphate crystal and 375.7 g of a 99.5% to 99.8% aqueous alcohol solution (aqueous ethanol solution) were introduced into the inside of a reactor equipped with a jacket, a vacuum pump, a condenser, a scrubber, a receiver, and/or the like, and were stirred. The reactor was maintained at a temperature of 24 to 25° C., and the lithium fluoride obtained as a by-product was removed by filtration.

Next, primary vacuum concentration was performed while maintaining the inside of the reactor at a temperature of 43 to 44° C. and an initial pressure of about 28 Torr respectively by introducing hot water into the jacket and operating the vacuum pump. The primary vacuum concentration was continued until all the alcohol vapor distilled from the reactor had been condensed in the condenser and thus no more liquid was collected in the receiver.

Next, the vacuum concentrate obtained through the primary vacuum concentration was subjected to secondary vacuum concentration, which was performed by reducing the pressure to 1 Torr while maintaining the internal temperature within the range of 43 to 44° C. The secondary vacuum concentration was continued until all the remaining aqueous alcohol solution had been condensed in the condenser and thus no more liquid was collected in the receiver.

Next, using a rotary evaporator, the resultant was completely dried over 12 hours at 85° C. while performing distillation using a pump having a degree of vacuum of 1 Torr. The dried product was cooled to a temperature of 25° C. to induce recrystallization, and thereby a lithium difluorophosphate crystal was finally obtained (yield: 93%, purity: 99.9%).

Examples 2 to 7 and Comparative Examples 1 to 6

The lithium difluorophosphate crystals of Examples 2 to 7 and Comparative Examples 1 to 6 were prepared, through recrystallization, in the same manner as in Example 1 but using a different amount of materials as shown in the following Table 1. In addition, for each pair of a $LiPO_2F_2$ crystal synthesized in Step 1 and a $LiPO_2F_2$ crystal obtained through recrystallization in Step 2, the degree of increase in purity was determined according to the following Formula 1 and is shown in the following Table 2.

TABLE 1

| | $LiPO_2F_2$ crystal synthesized in Step 1 | | | | $LiPO_2F_2$ crystal prepared in Step 2 (purification process), recrystallized | | |
|---|---|---|---|---|---|---|---|
| Classification | $LiPF_6$ (moles) | Chloride (moles) | Water (water-equivalent of steam) (moles) | Yield (%)/ Purity (%) | $LiPO_2F_2$ of Step 1 (parts by weight) | Aqueous alcohol solution (parts by weight) | Yield (%)/ Purity (%) |
| Example 1 | 1 | 4.22 | 3.93 | 95%/95.2 | 100 | 604 | 93%/99.9% |
| Example 2 | 1 | 4.92 | 3.93 | 94%/95.0 | 100 | 604 | 92%/99.9% |
| Example 3 | 1 | 4.05 | 3.93 | 91%/95.1 | 100 | 604 | 88%/99.8% |
| Example 4 | 1 | 4.22 | 4.35 | 88%/94.7 | 100 | 604 | 83%/99.7% |
| Example 5 | 1 | 4.22 | 3.65 | 91%/94.6 | 100 | 550 | 87%/99.7% |
| Example 6 | 1 | 4.22 | 3.93 | 95%/95.2 | 100 | 640 | 91%/99.9% |
| Example 7 | 1 | 4.22 | 3.93 | 95%/95.2 | 100 | 604 | 89%/99.9% |
| Comparative Example 1 | 1 | 5.60 | 3.93 | 80%/94.2 | 100 | 604 | 77%/99.5% |
| Comparative Example 2 | 1 | 3.74 | 3.93 | 82%/94.1 | 100 | 604 | 80%/99.5% |
| Comparative Example 3 | 1 | 4.22 | 4.67 | 88%/94.7 | 100 | 604 | 78%/99.2% |
| Comparative Example 4 | 1 | 4.22 | 3.31 | 89%/94.8 | 100 | 604 | 81%/99.1 |
| Comparative Example 5 | 1 | 4.22 | 3.93 | 95%/95.2 | 100 | 710 | 90%/99.9 |
| Comparative Example 6 | 1 | 4.22 | 3.93 | 95%/95.2 | 100 | 485 | 84%/99.9 |

TABLE 2

| Classification | Purity (%), Step 1 | Purity (%), Step 2 | Degree of increase in purity (%) |
|---|---|---|---|
| Example 1 | 95.2 | 99.9 | 4.94 |
| Example 2 | 95.0 | 99.9 | 5.16 |
| Example 3 | 95.1 | 99.8 | 4.94 |
| Example 4 | 94.7 | 99.7 | 5.28 |
| Example 5 | 94.6 | 99.7 | 5.39 |
| Example 6 | 95.2 | 99.9 | 4.94 |
| Example 7 | 95.2 | 99.9 | 4.94 |
| Comparative Example 1 | 94.2 | 99.5 | 5.63 |
| Comparative Example 2 | 94.1 | 99.5 | 5.74 |

TABLE 2-continued

| Classification | Purity (%), Step 1 | Purity (%), Step 2 | Degree of increase in purity (%) |
|---|---|---|---|
| Comparative Example 3 | 94.7 | 99.2 | 4.75 |
| Comparative Example 4 | 94.8 | 99.1 | 4.54 |
| Comparative Example 5 | 95.2 | 99.9 | 4.94 |
| Comparative Example 6 | 95.2 | 99.9 | 4.94 |

As shown in the "Yield (%)/Purity (%)" data of the Steps 1 and 2 in Table 1, in the case of Examples 1 to 7, a $LiPO_2F_2$ crystal was produced, through recrystallization, at a high yield of 83% or more and with a high degree of increase in purity of 4% or more.

On the other hand, in the case of Comparative Example 1 in which more than 5.5 moles of a chloride were used for one mole of $LiPF_6$, cost efficiency was low compared to Example 2, and in the case of Comparative Example 2 in which less than 4.0 moles of a chloride were used for one mole of $LiPF_6$, the yield was significantly low compared to Example 3.

Meanwhile in the case of Comparative Example 3 in which more than 4.5 moles of the water-equivalent of steam were used for one mole of $LiPF_6$, a side reaction undesirably took place, and in the case of Comparative Example 4 in which less than 3.5 moles of steam were introduced for one mole of $LiPF_6$, the yield was significantly low compared to Example 5.

In addition, in the case of Comparative Example 5 in which an aqueous alcohol solution was used in an amount of more than 700 parts by weight in the reaction of the Step 2, the use of a greater amount of the aqueous alcohol solution compared to Example 1 or Example 6 did not lead to an increase in yield. On the other hand, in the case of Comparative Example 6 in which an aqueous alcohol solution was used in an amount of less than 500 parts by weight, there was a large reduction in yield, from 95% in Step 1 to 84% in Step 2.

Examples 8 to 10 and Comparative Examples 7 to 14

The lithium difluorophosphate crystals of Examples 8 to 10 and Comparative Examples 7 to 14 were prepared, through recrystallization, in the same manner as in Example 1 but under different process conditions as shown in the following Table 3. In this case, the process conditions being varied were the temperature of the water-equivalent of steam in Step 1 and the conditions of the vacuum concentration processes in Step 2. In addition, for each pair of a $LiPO_2F_2$ crystal synthesized in Step 1 and a $LiPO_2F_2$ crystal obtained through recrystallization in Step 2, the degree of increase in purity was determined according to the above-described Formula 1 and is shown in the following Table 4.

TABLE 3

| | $LiPO_2F_2$ crystal synthesized in Step 1 | | $LiPO_2F_2$ crystal prepared in Step 2, recrystallized | | | |
|---|---|---|---|---|---|---|
| Classification (parts by weight) | Steam temperature | Yield (%)/ Purity (%) | Pressure for primary vacuum concentration | Temperature for primary vacuum concentration | Pressure for secondary vacuum concentration | Yield (%)/ Purity (%) |
| Example 1 | 70° C. | 95%/95.2 | 28 Torr | 43 to 44° C. | 1 Torr | 93%/99.9% |
| Example 8 | 65° C. | 85%/94.6 | 28 Torr | 43 to 44° C. | 1 Torr | 80%/99.7% |
| Example 9 | 78° C. | 93%/95.0 | 28 Torr | 43 to 44° C. | 1 Torr | 89%/99.8% |
| Example 10 | 70° C. | 95%/95.2 | 28 Torr | 40 to 41° C. | 1 Torr | 92%/99.9% |
| Comparative Example 7 | 49° C. | 80%/88.3 | 28 Torr | 43 to 44° C. | 1 Torr | 75%/93.0% |
| Comparative Example 8 | 85° C. | 94%/92.2 | 25 Torr | 43 to 44° C. | 1 Torr | 88%/95.7% |
| Comparative Example 9 | 70° C. | 95%/95.2 | 28 Torr | 35 to 36° C. | 1 Torr | 92%/96.9% |
| Comparative Example 10 | 70° C. | 95%/95.2 | 28 Torr | 48 to 49° C. | 1 Torr | 92%/99.8% |
| Comparative Example 11 | 70° C. | 95%/95.2 | 35 Torr | 43 to 44° C. | 1 Torr | 88%/99.8% |
| Comparative Example 12 | 70° C. | 95%/95.2 | 1 Torr | 43 to 44° C. | 1 Torr | 83%/97.0% |
| Comparative Example 13 | 70° C. | 95%/95.2 | 21 Torr | 43 to 44° C. | 1 Torr | 85%/97.1% |
| Comparative Example 14 | 70° C. | 95%/95.2 | 28 Torr | 43 to 44° C. | 4 Torr | 86%/98.2% |

TABLE 4

| Classification | Purity (%), Step 1 | Purity (%), Step 2 | Degree of increase in purity (%) |
|---|---|---|---|
| Example 8 | 94.6 | 99.7 | 5.39 |
| Example 9 | 95 | 99.8 | 5.05 |
| Example 10 | 95.2 | 99.9 | 4.94 |
| Comparative Example 7 | 88.3 | 93.0 | 5.32 |
| Comparative Example 8 | 92.2 | 95.7 | 3.80 |
| Comparative Example 9 | 95.2 | 96.9 | 1.79 |
| Comparative Example 10 | 95.2 | 99.8 | 4.83 |
| Comparative Example 11 | 95.2 | 99.8 | 4.83 |
| Comparative Example 12 | 95.2 | 97 | 1.89 |

TABLE 4-continued

| Classification | Purity (%), Step 1 | Purity (%), Step 2 | Degree of increase in purity (%) |
|---|---|---|---|
| Comparative Example 13 | 95.2 | 97.1 | 2.00 |
| Comparative Example 14 | 95.2 | 98.2 | 3.15 |

As shown in the "Yield (%)/Purity (%)" data of the Steps 1 and 2 in Table 3, in the case of Examples 1 and 8 to 10, a LiPO$_2$F$_2$ crystal was produced, through recrystallization, at a high yield of 80% or more and with a high degree of increase in purity of 3.5% or more.

On the other hand, in the case of Comparative Example 7 in which the steam temperature was less than 50° C., the yield and purity of a LiPO$_2$F$_2$ crystal produced through the synthesis in Step 1 was significantly low compared to Example 8, and in the case of Comparative Example 8 in which the temperature of the water-equivalent of steam was greater than 80° C., stability was adversely affected due to the increased reactivity compared to Example 9, and the purity of the LiPO$_2$F$_2$ crystal synthesized in Step 1 was relatively low rather than high.

Meanwhile in the case of Comparative Example 9 in which the primary vacuum concentration was performed at a temperature of less than 40° C., there was a problem that the purity is signigicantly lowed, compared to Example 10, and in the case of Comparative Example 10 in which the primary vacuum concentration was performed at a temperature of greater than 45° C., the same level of yield as in Example 10 was obtained, but the purity was decreased rather than increased compared to Example 10.

In addition, in the case of Comparative Example 11 in which the primary vacuum concentration of the Step 2 was performed at a pressure of greater than 30 Torr, the yield of the LiPO$_2$F$_2$ crystal obtained through recrystallization was significantly lower than the yield of the LiPO$_2$F$_2$ crystal synthesized in Step 1, and moreover, the degree of increase in purity was relatively low. In the case of Comparative Example 13 in which the primary vacuum concentration was performed at a pressure of less than 25 Torr, the degree of increase in purity was low compared to Example 1.

Meanwhile in the case of Comparative Example 12 in which the vacuum concentration was performed substantially as a single step rather than multiple steps since the primary and secondary vacuum concentration processes were performed under the same pressure (1 Torr) and temperature (43 to 44° C.) conditions, there was a large reduction in yield.

Through the above-described Examples, it has been confirmed that the method of the present invention can be used to produce a high-purity lithium difluorophosphate crystal at a high yield. The lithium difluorophosphate crystal of the present invention prepared by the method can be used as a component for a stabilizer for a chloroethylene polymer, a reaction catalyst for a lubricating oil, a toothbrush sterilizer, a wood preservative, and the like, and is preferably used as an electrolyte for a non-aqueous electrolyte solution for a secondary battery so that a non-aqueous electrolyte solution for a secondary battery having excellent stability can be provided.

The method of preparing a lithium difluorophosphate crystal according to the present invention is a solvent-free synthesis method that is capable of providing a high-purity lithium difluorophosphate crystal at a high yield, and the prepared lithium difluorophosphate crystal can be used as an electrolyte for a non-aqueous electrolyte solution for a secondary battery to provide a non-aqueous electrolyte solution for a secondary battery having excellent stability.

What is claimed is:

1. A method of preparing a high-purity lithium difluorophosphate crystal, the method comprising:
   Step 1 in which a lithium difluorophosphate crystal (LiPO$_2$F$_2$) is synthesized with a yield of 80 to 99.9% by reacting lithium hexafluorophosphate (LiPF$_6$), a chloride, and water under a solvent-free condition; and
   Step 2 in which the lithium difluorophosphate crystal is purified to prepare a recrystallized difluorophosphate crystal satisfying a yield of 75 to 95% and a degree of increase in purity of the following Formula 1:

$$4.0\% \leq (B-A)/A \times 100\% \leq 8.5\%$$  [Formula 1]

wherein in Formula 1, A represents the purity (%) of the lithium difluorophosphate crystal synthesized in the Step 1, and B represents the purity (%) of the recrystallized lithium difluorophosphate crystal obtained in the Step 2,
   wherein the Step 1 includes:
   Step 1-1 in which a mixture of pulverized reactants is prepared by pulverizing and mixing lithium hexafluorophosphate and a chloride;
   Step 1-2 in which the mixture of pulverized reactants is introduced into a reactor, and then air in the reactor is replaced with nitrogen gas by passing nitrogen gas through the reactor; and
   Step 1-3 in which a reaction product is obtained by introducing steam into the reactor, carrying out a reaction while bubbling the steam, and performing filtration, and
   the Step 2 includes:
   Step 2-1 in which purification is performed by introducing the lithium difluorophosphate crystal and an aqueous solution of an alcohol having two to four carbon atoms into a reactor and stirring;
   Step 2-2 in which the product of the purification is subjected to primary vacuum concentration under a condition of a temperature of 40 to 45° C. and a pressure of 25 to 30 Torr;
   Step 2-3 in which the primary vacuum concentrate is subjected to secondary vacuum concentration under a condition of a temperature of 40 to 55° C. and a pressure of 2 Torr or less; and
   Step 2-4 in which the secondary vacuum concentrate is dried and subsequently cooled to induce recrystallization, and thereby a lithium difluorophosphate crystal is obtained.

2. The method of claim 1, wherein in the Step 1-1, the lithium hexafluorophosphate and the chloride are mixed in a molar ratio of 1:4.0 to 5.5.

3. The method of claim 1, wherein the steam of the Step 1-3 has a temperature of 50 to 80° C. and is introduced in an amount such that there are 3.5 to 4.5 moles of the steam for one mole of the lithium hexafluorophosphate of the Step 1-1, wherein the amount of the steam referred to in the molar ratio is based on an amount of water contained in the steam.

4. A method of preparing a high-purity lithium difluorophosphate crystal, the method comprising:
   Step 1 in which a lithium difluorophosphate crystal (LiPO$_2$F$_2$) is synthesized with a yield of 80 to 99.9% by reacting a chloride hydrate and lithium hexafluorophosphate (LiPF$_6$) under a solvent-free condition; and Step 2 in which the lithium difluorophosphate crystal is purified to prepare a recrystallized difluorophosphate crystal satisfying a yield of 75 to 95% and a degree of increase in purity of the following Formula 1:

$$4.0\% \leq (B-A)/A \times 100\% \leq 8.5\%  \quad \text{[Formula 1]}$$

wherein in Formula 1, A represents the purity (%) of the lithium difluorophosphate crystal synthesized in the Step 1, and B represents the purity (%) of the recrystallized lithium difluorophosphate crystal obtained in the Step 2, wherein the Step 1 includes:

Step 1-1 in which a chloride hydrate is prepared by mixing and reacting a chloride and water;

Step 1-2 in which lithium hexafluorophosphate is added to the chloride hydrate, which has been recovered, in a reactor, and then air in the reactor is replaced with nitrogen gas by passing nitrogen gas through the reactor; and Step 1-3 in which a reaction product is obtained by raising a temperature, carrying out a reaction, and performing filtration, and the Step 2 includes:

Step 2-1 in which purification is performed by introducing the lithium difluorophosphate crystal and an aqueous solution of an alcohol having two to four carbon atoms into a reactor and stirring;

Step 2-2 in which the product of the purification is subjected to primary vacuum concentration under a condition of a temperature of 40 to 45° C. and a pressure of 25 to 30 Torr;

Step 2-3 in which the primary vacuum concentrate is subjected to secondary vacuum concentration under a condition of a temperature of 40 to 45° C. and a pressure of 2 Torr or less and Step 2-4 in which the secondary vacuum concentrate is dried and subsequently cooled to induce recrystallization, and thereby a lithium difluorophosphate crystal is obtained.

5. The method of claim 4, wherein in the Step 1-1, the chloride hydrate is prepared by reacting the chloride and the water, which have been mixed in a molar ratio of 1:0.35 to 0.80.

6. The method of claim 4, wherein in the Step 1-2, the lithium hexafluorophosphate is introduced in an amount such that there is 0.15 to 0.40 mole of the lithium hexafluorophosphate for one mole of the chloride of the Step 1-1.

7. The method of claim 1, wherein in the Step 2-1, the aqueous alcohol solution is used in an amount of 550 to 650 parts by weight with respect to 100 parts by weight of the lithium difluorophosphate crystal.

* * * * *